United States Patent
Noh et al.

(10) Patent No.: US 10,230,107 B2
(45) Date of Patent: Mar. 12, 2019

(54) METHOD OF MANUFACTURING CATHODE ACTIVE MATERIAL AND CATHODE ACTIVE MATERIAL MANUFACTURED BY THE SAME

(71) Applicant: ECOPRO BM CO., LTD., Cheongju-si, Chungcheongbuk-do (KR)

(72) Inventors: Hyung Joo Noh, Cheongju-si (KR); Suk Yong Jeon, Chungju-si (KR); Moon Ho Choi, Cheongju-si (KR); Jin Kyeong Yun, Cheongju-si (KR); Dong Hee Kim, Changwon-si (KR)

(73) Assignee: ECOPRO BM CO., LTD., Chungcheongbuk-Do (KR)

( * ) Notice: Subject to any disclaimer, the term of this patent is extended or adjusted under 35 U.S.C. 154(b) by 85 days.

(21) Appl. No.: 15/513,795

(22) PCT Filed: Dec. 16, 2016

(86) PCT No.: PCT/KR2016/015193
§ 371 (c)(1),
(2) Date: Mar. 23, 2017

(87) PCT Pub. No.: WO2017/116081
PCT Pub. Date: Jul. 6, 2017

(65) Prior Publication Data
US 2018/0040892 A1    Feb. 8, 2018

(30) Foreign Application Priority Data

Dec. 31, 2015 (KR) .......... 10-2015-0190675
Dec. 22, 2016 (KR) .......... 10-2016-0176783

(51) Int. Cl.
| | |
|---|---|
| H01M 4/525 | (2010.01) |
| H01M 4/04 | (2006.01) |
| H01M 10/04 | (2006.01) |
| H01M 10/052 | (2010.01) |
| H01M 10/056 | (2010.01) |
| C01G 53/00 | (2006.01) |
| C08G 73/02 | (2006.01) |
| H01M 4/38 | (2006.01) |

(52) U.S. Cl.
CPC ............ *H01M 4/525* (2013.01); *C01G 53/50* (2013.01); *H01M 4/04* (2013.01); *H01M 10/0404* (2013.01); *H01M 10/052* (2013.01); *H01M 10/056* (2013.01); *C01P 2006/80* (2013.01); *C08G 73/0233* (2013.01); *H01M 4/38* (2013.01)

(58) Field of Classification Search
None
See application file for complete search history.

(56) References Cited

U.S. PATENT DOCUMENTS

2002/0150820 A1*  10/2002  Kanai ............... H01M 4/40
                                              429/231.1
2015/0194662 A1*   7/2015  Yang ............... H01M 4/131
                                              429/223

* cited by examiner

*Primary Examiner* — Alix E Eggerding
(74) *Attorney, Agent, or Firm* — Amster, Rothstein & Ebenstein LLP (57) ABSTRACT

Disclosed are a method of manufacturing a cathode active material and a cathode active material manufactured by the same, and more particularly, a cathode active material which is rinsed by a compound including thiol group, includes residual sulfur on a surface, and has decreased residual lithium and a method of manufacturing the same.

11 Claims, 3 Drawing Sheets

METHOD OF MANUFACTURING CATHODE ACTIVE MATERIAL AND CATHODE ACTIVE MATERIAL MANUFACTURED BY THE SAME

CROSS-REFERENCE TO RELATED APPLICATIONS

A claim for priority under 35 U.S.C. § 119 is made to Korean Patent Application No. 10-2015-0190675 filed Dec. 31, 2015, Korean Patent Application No. 10-2016-0176783 filed Dec. 22, 2016 in the Korean Intellectual Property Office, the entire contents of which are hereby incorporated by reference.

BACKGROUND

Embodiments of the inventive concept described herein relate to a method of manufacturing a cathode active material and a cathode active material manufactured by the same, and more particularly, relate to a cathode active material which is rinsed by a compound including thiol group, includes residual sulfur on a surface, and having decreased residual lithium and a method of manufacturing the same.

A battery generates electrical power using materials which are capable of electrochemically reacting with each other at an anode and a cathode. A typical battery of such batteries includes a lithium secondary battery, which generates electrical energy by change of chemical potential when lithium ions are intercalated or deintercalated at an anode and a cathode.

The lithium secondary battery uses materials which are capable of being reversibly intercalated and deintercalated as an anode active material and a cathode active material, and is manufactured by being filled with an organic electrolyte or a polymer electrolyte between the anode and the cathode.

A lithium complex oxide is used as a cathode active material of the lithium secondary battery. A method of manufacturing the lithium complex oxide includes forming a precursor of transition metal, mixing the precursor of transition metal with a lithium compound, and plasticizing the mixture.

For Example, complex metallic oxides, such as $LiCoO_2$, $LiMn_2O_4$, $LiNiO_2$, and $LiMnO_2$, used as the lithium complex oxide have been studied. $LiCoO_2$ among the above compounds is excellent in cycle life and charge/discharge efficiency, thereby being used the most. However, structural stability is weak, and there is disadvantage in price competition since cobalt used as a base material is limited thereby being expensive.

A lithium manganese oxide, such as $LiMnO_2$, $LiMn_2O_4$, is superior in thermal stability and in price. However, the lithium manganese oxide has a small capacity and is inferior in high temperature.

Furthermore, a $LiNiO_2$ group cathode active material has high discharge capacity. However, synthesis of the $LiNiO_2$ group cathode active material is difficult since cation mixing occurs between Li and transition metal, thereby being disadvantage in rate characteristics.

In addition, since Ni rich system which has Ni of 65% or more is cold reaction, residual lithium existing in LiOH or $Li_2CO_3$, which is remained on a surface of the cathode active material, is large in quantity. Such residual lithium i.e. unreacted LiOH or $Li_2CO_3$ reacts with an electrolyte in the battery to generate gas and to lead to swelling phenomenon, thereby lowering stability at high temperature. Furthermore, the unreacted LiOH or $Li_2CO_3$ may cause gelation since viscosity is increased when mixing the unreacted LiOH to form a slurry before forming an electrode plate.

SUMMARY

Embodiments of the inventive concept provide a method of manufacturing a cathode active material having a new structure in which an amount of residual lithium is decreased.

Embodiments of the inventive concept provide a cathode material manufactured by the method of manufacturing the cathode active material.

According to an aspect of an embodiment, a method of manufacturing a cathode active material includes preparing one selected from the group consisting of cathode active materials represented by Chemical Formula 1 and Chemical Formula 2:

[Chemical Formula 1]

[Chemical Formula 2]

wherein in Chemical Formula 1 and Chemical Formula 2, $0.9 \leq x1 \leq 1.3$, $0 \leq y1 \leq 0.4$, $0 \leq y2 \leq 0.4$, $0 \leq z2 \leq 0.4$, $0 \leq y2+z2 \leq 0.4$, and $0 \leq \alpha \leq 2$, M1 and M2 are at least one selected from the group consisting of Al, Ni, Mn, Cr, Fe, Mg, Sr, V, Zn, W, Zr, B, Ba, Sc, Cu, Ti, Co, rare-earth elements, and a combination thereof, X is at least one selected from the group consisting of O, F, S, and P, rinsing the cathode active material using a solution including a compound including thiol group, and drying the rinsed cathode active material.

Rinsing the cathode active material using the solution including compound including thiol group may include putting distilled water and the compound including thiol group into a reactor to prepare the solution including thiol group maintaining an inner temperature of the reactor at 5 to 50° C., and putting the cathode active material into the reactor and stirring.

the compound including thiol group may include one selected from the group consisting of 2-thiazoline-2-thiol, 5-amino-1,3,4-thiadiazole-2-thiol, 1,3,4-thiadiazole-2,5-dithiol, 2,5-dimethylfuran-3-thiol, (1,2,4)thiadiazole-3,5-dithiol, 1-phenyl-1h-tetrazole-5-thiol, 4-methyl-4h-1,2,4-triazole-3-thiol, 5-methyl-1,3,4-thiadizole-2-thioldithioglycol, s-triazine-2,4,6-trithiol, 7-methyl-2,6,8-trimercaptopurine, and 4,5-diamino-2,6-dimercaptopyrimidine.

Putting distilled water and the compound including thiol group into the reactor to prepare the solution including thiol group may include mixing 0.01 to 10 parts by weight of the compound including thiol group per 100 parts by weight of DIW.

Rinsing the cathode active material using the solution including compound including thiol group may include depositing the cathode active material on a filter member, and filtering the solution including thiol group through the filter member including the cathode active material to rinse the cathode active material.

Rinsing the cathode active material using the solution including compound including thiol group may include putting distilled water and the compound including thiol group into a reactor to prepare the solution including thiol group, maintaining an inner temperature of the reactor at 5 to 50° C., putting the cathode active material into the reactor and stirring, depositing the rinsed cathode active material on a filter member, and filtering the solution including thiol group through the filter member including the cathode active material to rinse the cathode active material.

Rinsing the cathode active material using the solution including compound including thiol group may include a filter press method including preparing a filter type of the cathode active material and pressuring the solution including a compound including thiol group instead of putting the solution including the compound including thiol group into the reactor, putting the cathode active material, and stirring.

Rinsing the cathode active material using the solution including compound including thiol group may include depositing the rinsed cathode active material on a filter member, filtering the solution including thiol group through the filter member including the cathode active material to rinse the cathode active material, putting distilled water and the compound including thiol group into a reactor to prepare a solution including thiol group, maintaining an inner temperature of the reactor at 5 to 50° C., and putting the cathode active material into the reactor and stirring.

Namely, rinsing the cathode active material using the solution including compound including thiol group may include a first rinse including putting the cathode active material into the solution including the compound including thiol group, and stirring and a second rinse i.e. the filter press method including depositing the rinsed cathode active material on the filter member and filtering the solution. Alternatively, rinsing the cathode active material may include a first rinse i.e. the filter press method including depositing the cathode active material on the filter member and filtering the solution and a second rinse including putting the cathode active material and the solution including the compound including thiol group into the reactor. Furthermore, in case of necessity, rinsing the cathode active material may be performed many times.

Drying the rinsed cathode active material may be performed at 50 to 400° C. for 1 to 20 hours.

In at least some particles of the cathode active material, at least one selected from the group consisting of Ni, Co, M1 and M2 may have concentration gradient, where concentration may be increased or decreased from a central part of the particles to a peripheral part of the particles.

The area having concentration gradient may occupy 80% or more of the entire particles area.

The area having concentration gradient may occupy 10 to 50% of the entire particles area.

The particles may be uniform in size or the particles having different sizes may be mixed.

According to another aspect of an embodiment, a cathode active material manufactured by the manufacturing method of any one of claim 1 to claim 11 is provided.

In residual lithium of the cathode active material, LiOH may include residual lithium of 0.3% by weight or less and $Li_2CO_3$ may include residual lithium of 0.5% by weight or less.

The cathode active material may include sulfur of 500 to 5000 ppm.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the present invention will be described in details. However, the present invention is not limited to the embodiments.

<Preparation Example 1> Preparation of Rinsing the Solution Including Thiol Group 1,3,4-thiadiazole-2,5-dithiol used as a thiol material dissolved in distilled water (DIW) to prepare the rinsing the solution including thiol group.

<Preparation Example 2> Preparation of Rinsing the Solution Including Thiol Group 2-thiazoline-2-thiol used as thiol material dissolved in DIW to prepare the rinsing the solution including thiol group.

<Preparation Example 3> Preparation of Rinsing the Solution Including Thiol Group 2,5-dimethylfuran-3-thiol used as thiol material dissolved in DIW, prepare the rinsing the solution including thiol group.

<Preparation Examples 4 to 10> Preparation of Cathode Active Material

Cathode active materials were prepared as described in Table 1.

TABLE 1

| | |
|---|---|
| PREPARATION Example 4 | CSG131—a cathode active material wherein Ni:Co:Mn was 8:1:1 in an average composition ratio of the entire particles, there was concentration gradient in the particles, and an average size of the particles was uniform. |
| PREPARATION Example 5 | CSG131—a cathode active material wherein Ni:Co:Mn was 8:1:1 in an average composition ratio of the entire particles, there was concentration gradient in the particles, and sizes of the particles were non-uniform. |
| PREPARATION Example 6 | CGS131—a cathode active material wherein Ni:Co:Mn was 8:1:1 in an average composition ratio of the entire particles, there was concentration gradient in the particles, and an average size of the particles was uniform. 0.25 moles of Ti per 1 mole of the cathode active material were coated. |
| PREPARATION Example 7 | CSG131—a cathode active material wherein Ni:Co:Mn was 8:1:1 in an average composition ratio of the entire particles, there was concentration gradient in the particles, and an average size of the particles was uniform. 0.05 moles of Zr per 1 mole of the cathode active material were coated. |
| PREPARATION Example 8 | NCA |
| PREPARATION Example 9 | A cathode active material wherein an average content of nickel was 88% of the entire particles, and there was concentration gradient in the particles. |
| PREPARATION Example 10 | NCM having nickel content of 88%. |

<Example 1> Rinsing Active Material

The rinsing the solution including thiol group prepared in Preparation Example 1 was put in a reactor at 5 to 50° C. of an inner temperature of the reactor. Then, the cathode active material, where there was concentration gradient, Ni:Co:Mn was 8:1:1 in an average composition ratio of the entire particles, and the particles was uniform in size, which was prepared in Preparation Example 4, was put in the reactor to form a slurry. The mixed slurry was stirred at 1800 rpm for 5 minutes to rinse the cathode active material.

The rinsed slurry including the cathode active material was filtered by a filter press and thermally dried at 130° C. for 12 hours in a vacuum to form the rinsed active material of Example 1.

<Example 2> Rinsing Active Material

The cathode active material, where there was concentration gradient, Ni:Co:Mn was 8:1:1 in an average composition ratio of the entire particles, and the particles was uniform in size, which was prepared in Preparation Example 4, was deposited on a filter member. Then, the rinsing the solution including thiol group which was prepared in Preparation Example 1 was maintained at 50° C. while 200 parts by weight of the rinsing the solution including thiol group per 100 parts by weight of the cathode active material was filtered by a filter press to rinse the cathode active material.

The rinsed cathode active material slurry performed thermal treatment at 130° C. for 12 hours in a vacuum to form the rinsed active material of Example 2.

<Example 3> Rinsing Active Material

The rinsing the solution including thiol group prepared in Preparation Example 1 put in a reactor at 5 to 50° C. of an inner temperature of the reactor. Then, the cathode active material where there was concentration gradient, Ni:Co:Mn was 8:1:1 in an average composition ratio of the entire particles, and the particles was uniform in size, which was prepared in Preparation Example 4, put in the reactor to form a slurry. The mixed slurry was stirred at 1800 rpm for 5 minutes to rinse the cathode active material.

Then, after the rinsed cathode active material was deposited on a filter member, the rinsing the solution including thiol group prepared in Preparation Example 1 was maintained at 50° C. while 200 parts by weight of the rinsing the solution including thiol group per 100 parts by weight of the cathode active material was filtered by a filter press to rinse the cathode active material.

The rinsed cathode active material slurry performed thermal treatment at 130° C. for 12 hours in a vacuum to form the rinsed active material of Example 3.

<Example 4> Rinsing Active Material

The cathode active material, where there was concentration gradient, Ni:Co:Mn was 8:1:1 in an average composition ratio of the entire particles, and the particles was non-uniform in size, which was prepared in Preparation Example 5, was rinsed in the same manner as Example 1 to form the cathode active material of Example 4.

<Example 5> Rinsing Active Material

The cathode active material, where there was concentration gradient, Ni:Co:Mn was 8:1:1 in an average composition ratio of the entire particles, and the particles was non-uniform in size, which was prepared in Preparation Example 5, was rinsed in the same manner as Example 3 to form the cathode active material of Example 5.

<Example 6> Rinsing Active Material

The cathode active material on which Ti is coated, was prepared in Preparation Example 6. The cathode active material of Preparation Example 6 was rinsed in the same manner as Example 3 to form the cathode active material of Example 6.

<Example 7> Rinsing Active Material

The cathode active material on which Zr is coated, was prepared in Preparation Example 7. The cathode active material of Preparation Example 7 was rinsed in the same manner as Example 3 to form the cathode active material of Example 7.

<Example 8> Rinsing Active Material 0.3 parts by weight of the thiol compound of the thiol the solution per 100 parts by weight of DIW were formed, and then the cathode active material, where there was concentration gradient, Ni:Co:Mn was 8:1:1 in an average composition ratio of the entire particles, and the particles was uniform in size, which was prepared in Preparation Example 4, was rinsed in the same manner as Example 3 to form the cathode active material of Example 8.

<Example 9> Rinsing Active Material

An input amount of the thiol compound of the thiol the solution was adjusted to be 1.7 times in comparison with Example 8, and then the cathode active material, where there was concentration gradient, Ni:Co:Mn was 8:1:1 in an average composition ratio of the entire particles, and the particles was uniform in size, which was prepared in Preparation Example 4, was rinsed in the same manner as Example 3 to form the cathode active material of Example 9.

<Example 10> Rinsing Active Material

An input amount of the thiol compound of the thiol the solution was adjusted to be 1.7 times in comparison with Example 8, and then the cathode active material i.e. NCA prepared in Preparation Example 8 was rinsed in the same manner as Example 1 to form the cathode active material of Example 10.

<Example 11> Rinsing Active Material

The cathode active material prepared in Preparation Example 5 was rinsed using the rinsing the solution including thiol group, which was prepared in Preparation Example 2, in the same manner as Example 1 to form the cathode active material of Example 11.

<Example 12> Rinsing Active Material

The cathode active material prepared in Preparation Example 9 was rinsed using the rinsing the solution including thiol group, which was prepared in Preparation Example 2, in the same manner as Example 1 to form the cathode active material of Example 12.

<Example 13> Rinsing Active Material

The cathode active material prepared in Preparation Example 10 was rinsed using the rinsing the solution including thiol group, which was prepared in Preparation Example 2, in the same manner as Example 1 to form the cathode active material of Example 13.

<Example 14> Rinsing Active Material

The cathode active material prepared in Preparation Example 4 was rinsed using the rinsing the solution including thiol group, which was prepared in Preparation Example 3, in the same manner as Example 1 to form the cathode active material of Example 14.

<Example 15> Rinsing Active Material

The cathode active material prepared in Preparation Example 5 was rinsed using the rinsing the solution including thiol group prepared in Preparation Example 3 in the same manner as Example 1 to form the cathode active material of Example 14.

<Example 16> Rinsing Active Material

The cathode active material prepared in Preparation Example 10 was rinsed using the rinsing the solution including thiol group, which was prepared in Preparation Example 3, in the same manner as Example 1 to form the cathode active material of Example 16.

Comparative Example 1

The cathode active material prepared in Preparation Example 4 was not rinsed to form the cathode active material of Comparative Example 1.

Comparative Example 2

The cathode active material prepared in Preparation Example 5 was rinsed in the same manner as Example 1 using DIW instead of the rinsing the solution including thiol group to form the cathode active material of Comparative Example 2.

Comparative Example 3

An input amount of the thiol compound of the thiol the solution was adjusted to be 2.3 times in comparison with Example 8, and then the cathode active material, where there was concentration gradient, Ni:Co:Mn was 8:1:1 in an average composition ratio of the entire particles, and the particles was uniform in size, which was prepared in Preparation Example 4, was rinsed in the same manner as Example 3 to form the cathode active material of Comparative Example 3.

Comparative Example 4

The cathode active material prepared in Preparation Example 8 was rinsed in the same manner as Example 1 using DIW instead of the rinsing the solution including thiol group to form the cathode active material of Comparative Example 4.

Comparative Example 5

The cathode active material prepared in Preparation Example 9 was rinsed in the same manner as Example 1 using DIW instead of the rinsing the solution including thiol group to form the cathode active material of Comparative Example 5.

<Experimental Example 1> Measurement of Unreacted Lithium 5 g of each cathode active material prepared in Examples was put into 100 ml of DIW, was stirred for 15 minutes, was filtered, and obtained 50 ml of the solution. 0.1M HCl was put into the obtained the solution and then HCl consumption was measured based on a variation in the pH level.

Q1 and Q2 were determined by HCl consumption, residual lithium i.e. unreacted LiOH and $Li_2CO_3$ were calculated as in equations below, and the results are shown in Table 2.

M1=23.94(LiOH Molecular weight)

M2=73.89(LiCO Molecular weight)

SPL Size=(Sample Weight*The solution Weight)/ Water Weight

LiOH (wt %)=[(Q1−Q2)*C*M1*100]/(SPL Size*1000)

LiCO (wt %)=[2*Q2*C*M2/2*100]/(SPL Size*1000)

TABLE 2

|  | R. Li (ppm) | | |
| --- | --- | --- | --- |
|  | LiOH | $Li_2CO_3$ | Total |
| Comparative Example 1 | 4,536 | 4,531 | 9,067 |
| Comparative Example 2 | 1,180 | 1,447 | 2,627 |
| Comparative Example 3 | 1,165 | 1,962 | 3,126 |
| Comparative Example 4 | 781 | 3,184 | 3,965 |
| Comparative Example 5 | 1,367 | 1,769 | 3,136 |
| Example 1 | 1,284 | 1,714 | 2,998 |
| Example 2 | 1,342 | 1,995 | 3,337 |
| Example 3 | 1,241 | 1,735 | 2,976 |
| Example 4 | 1,410 | 1,499 | 2,909 |
| Example 5 | 1,912 | 1,810 | 3,723 |
| Example 6 | 2,166 | 1,372 | 3,538 |
| Example 7 | 1,984 | 1,628 | 3,612 |
| Example 8 | 1,750 | 1,465 | 3,216 |
| Example 9 | 1,634 | 1,523 | 3,156 |
| Example 10 | 196 | 3,008 | 3,204 |
| Example 11 | 1,838 | 1,617 | 3,455 |
| Example 12 | 1,689 | 1,598 | 3,287 |
| Example 13 | 1,538 | 1,725 | 3,263 |
| Example 14 | 1,732 | 1,626 | 3,358 |
| Example 15 | 1,468 | 1,518 | 2,986 |

Referring to the results of table 2, in the case of rinse using the compound including thiol group, it is shown that the residual lithium amount is significantly decreased in comparison with Comparative Example 1 where rinse was not performed.

<Experimental Example 2> Measurement of Residual Sulfur Amount

The residual sulfur amount of each active material of Examples prepared by Preparation Examples and Comparative Examples was measured by inductively coupled plasma (ICP) and the results were shown in table 3 below.

TABLE 3

| | Residual Sulfur Amount after Rinse (ppm) |
|---|---|
| Comparative Example 1 | — |
| Comparative Example 2 | 491 |
| Comparative Example 3 | 2,218 |
| Comparative Example 4 | — |
| Comparative Example 5 | 326 |
| Example 1 | 1,841 |
| Example 2 | 1,561 |
| Example 3 | 1,607 |
| Example 4 | 827 |
| Example 5 | 1,832 |
| Example 6 | 1,609 |
| Example 7 | 1,605 |
| Example 8 | 1,051 |
| Example 9 | 1,583 |
| Example 10 | — |
| Example 11 | 1,786 |
| Example 12 | 1,109 |
| Example 13 | 1,325 |
| Example 14 | 1,617 |
| Example 15 | 1,287 |

Referring to the results of Table 3, as thiol content of the compound the solution including thiol, which is used for rinse, is increased, it is shown that the residual sulfur amount is highly measured.

<Preparation Example 11> Half Cell Preparation

A mixture including 94% by weight of each cathode active material prepared in Examples and Comparative Examples, 3% by weight of a conductive material (super-P), and 3% by weight of a binder (PVDF) was mixed at the rate of 4.7 g of cathode active material:0.15 g of the conductive material (super-P):0.15 g of the binder (PVDF). After being stirred by a stirrer at 1900 rpm for 10 minutes, the mixture was deposited on Al foil using a micro film-applicator, and dried in a dry-oven at 135° C. for 4 hours to form a positive plate. A lithium metallic foil was used as a negative plate and W-scope-20 μm polypropylene was used as a separation film, and 1.15M LiPF in EC/EMC/DMC/FB=3/3/3/1 was used as an electrolyte, thereby forming a coin cell.

<Experimental Example 3> Evaluation of Cell Characteristics

Charge/discharge characteristics and cycle life of the half cell including each active material of Examples prepared in Preparation Examples and Comparative Examples were measured and the results were shown table 4 and FIGS. 1 to 5.

TABLE 4

| | 1$^{st}$ Discharge Capacity (Mah/G) | 1$^{st}$ Efficiency (%) | Cycle Life (%) |
|---|---|---|---|
| Comparative Example 1 | 194.5 | 87.7 | — |
| Comparative Example 2 | 201.3 | 89.4 | 91.9 |
| Comparative Example 3 | 193.8 | 90.0 | 98.1 |
| Comparative Example 4 | 208.1 | 90.6 | 81.3 |
| Comparative Example 5 | 207.6 | 88.9 | 81.8 |
| Example 1 | 203.7 | 91.1 | 97.3 |
| Example 2 | 204.4 | 91.3 | 95.3 |
| Example 3 | 206.3 | 92.3 | 97.3 |
| Example 4 | 203.5 | 90.8 | 93.1 |
| Example 5 | 204 | 92.4 | 98.5 |
| Example 6 | 205.2 | 93.2 | 97.4 |
| Example 7 | 199.7 | 92.1 | 95.3 |
| Example 8 | 199 | 90.5 | 94.5 |
| Example 9 | 196.8 | 90.6 | 97 |
| Example 10 | 207.8 | 89.7 | 94 |
| Example 11 | 205.7 | 91.9 | 97.7 |
| Example 12 | 217.6 | 92.3 | 95.9 |
| Example 13 | 217.8 | 91.9 | 91.5 |
| Example 14 | 206.3 | 92.0 | 96.5 |
| Example 15 | 218.2 | 92.1 | 90.6 |

Figure 1:
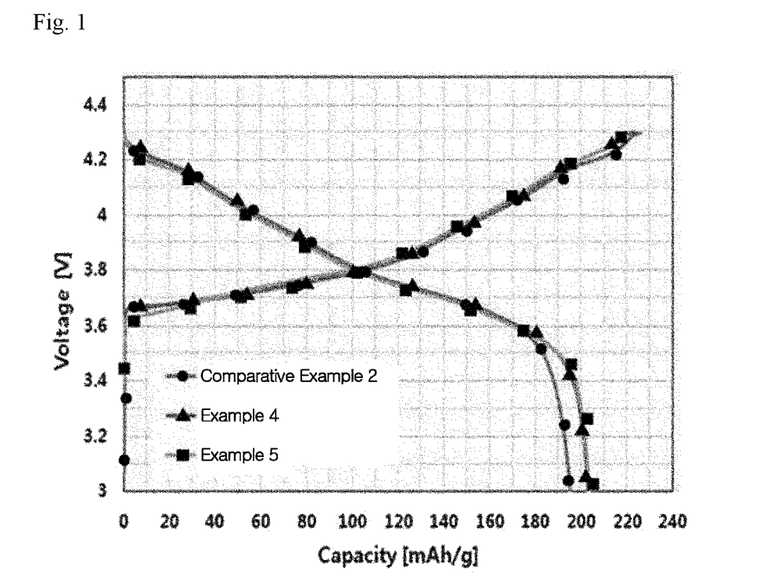
FIGS. 1 to 3 show results of measuring charge/discharge characteristics of batteries manufactured using cathode active materials of Examples of the inventive concept and Comparative Examples.

FIG. 1 shows results of measuring discharge capacity and charge/discharge efficiency depending on rinsing methods of CSG131—where the particles of the cathode active material are non-uniform, prepared in Preparation Example 5. It is shown that discharge capacity and charge/discharge efficiency in Example 4 and Example 5 where the cathode active materials are rinsed by the solution having thiol group polymer material are superior in discharge capacity and charge/discharge efficiency of Comparative Example 2 where the cathode active material is rinsed by DIW.

Figure 2:
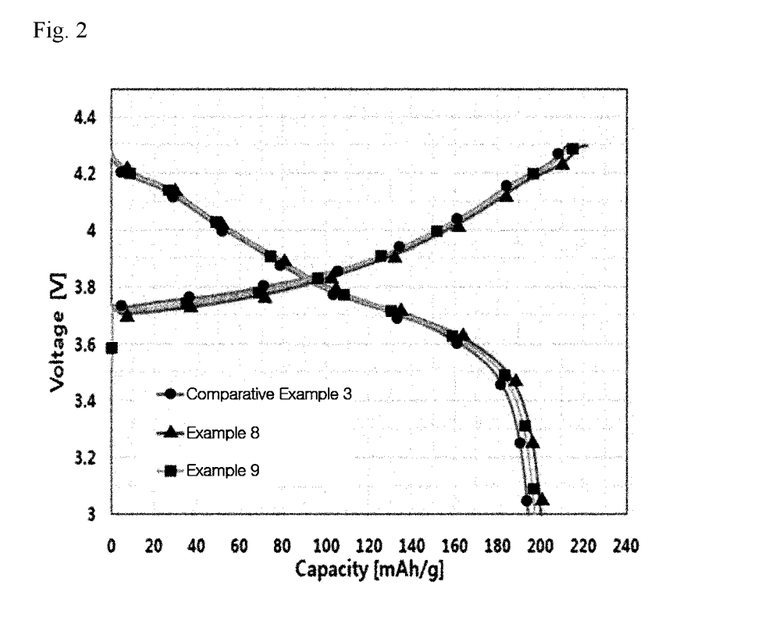

FIG. 2 shows results of measuring discharge capacity and charge/discharge efficiency depending on rinsing methods of CSG131—where the particles of the cathode active material are uniform, prepared in Preparation Example 4. It is shown that discharge capacity and charge/discharge efficiency are excellent when the cathode active material is rinsed by the solution having thiol group polymer material. However, discharge capacity and charge/discharge efficiency are decreased when the excess the solution is added as described in Comparative Example 3.

Figure 3:
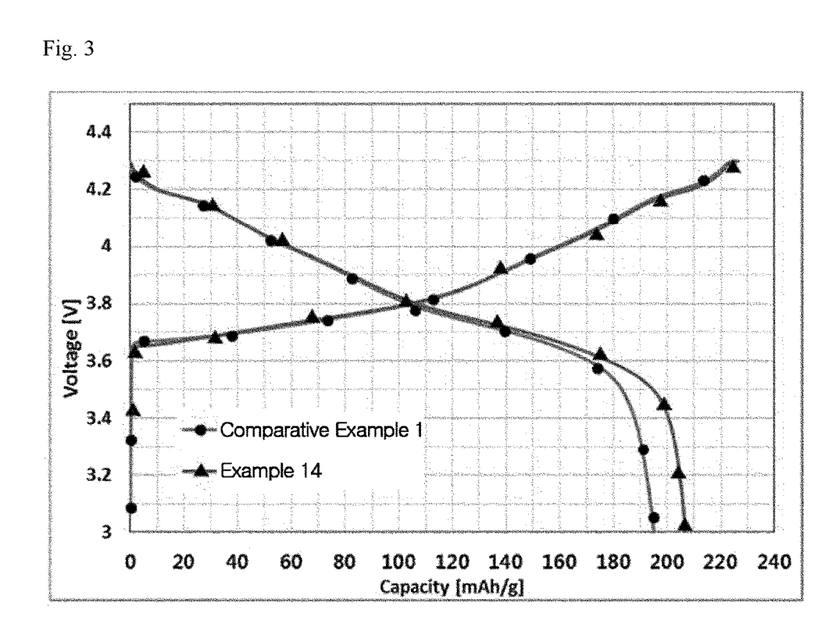
Figure 4:
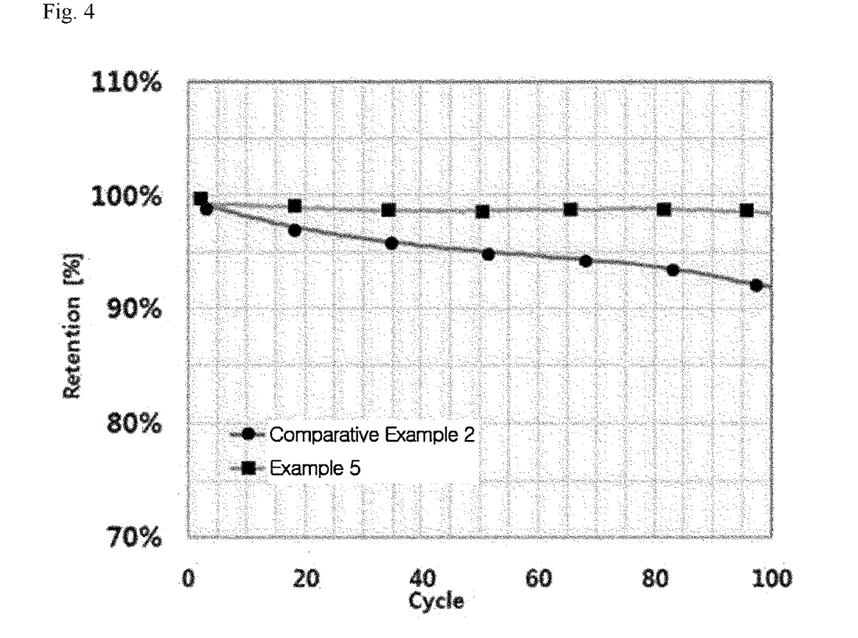
FIGS. 4 and 5 show results of measuring cycle life of batteries manufactured by the cathode active materials of Examples of the inventive concept and Comparative Examples.

FIG. 3 shows results of measuring discharge capacity and charge/discharge efficiency of Comparative Example 1 where rinse is not performed and Example 14 using 2,5-dimethylfuran-3-thiol used as thiol group polymer material. It is shown that, when rinsing the cathode active material, discharge capacity and charge/discharge efficiency are superior. FIG. 4 shows cycle life of the cathode active material of Comparative Example 2 where the cathode active material is rinsed by DIW and the cathode active material of Example 5 where the cathode active material is rinsed twice. It is shown that cycle life of the cathode active material of Example 5 is higher than that of Comparative Example 2.

Figure 5:
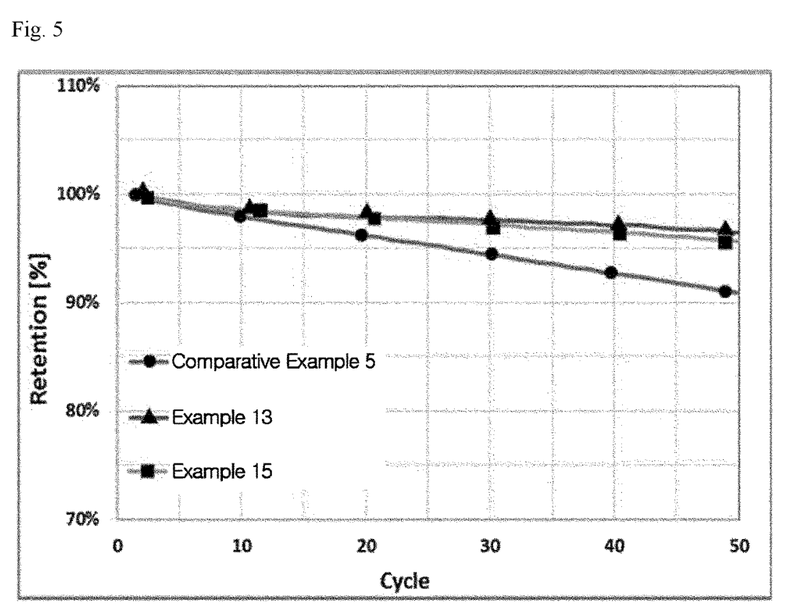

FIG. 5 shows cycle life of the cathode active material of Comparative Example 5 where the cathode active material including the particles having non-uniform sizes is rinsed by DIW, the cathode active material of Example 13 where the NCM cathode active material including 88% of Ni is rinsed by 2-thiazoline-2-thiol, and the cathode active material of Example 15 where the NCM cathode active material including 88% of Ni is rinsed by 2,5-dimethylfuran-3-thiol. Cycle life of Example 13 and Example 15 where the cathode active materials are rinsed by the solution including thiol group polymer material is superior to Comparative Example 5.

As is apparent from the above description, according to the present invention, since the cathode active material is rinsed by the compound including thiol group the manufactured cathode active material includes residual sulfur and the unreacted residual lithium is significantly reduced.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of manufacturing a cathode active material comprising:

preparing one selected from the group consisting of cathode active materials represented by Chemical Formula 1 and Chemical Formula 2:

$$Li_{x1}Ni_{1-y1}M1_{y1}O_{2-\alpha}X_\alpha \qquad \text{[Chemical Formula 1]}$$

$$Li_{x1}Ni_{1-y2-z2}Co_{y2}M2_{z2}O_{2-\alpha}X_\alpha \qquad \text{[Chemical Formula 2]}$$

(wherein in Chemical Formula 1 and Chemical Formula 2, $0.9 \leq x1 \leq 1.3$, $0 \leq y1 \leq 0.4$, $0 \leq y2 \leq 0.4$, $0 \leq z2 \leq 0.4$, $0 \leq y2+z2 \leq 0.4$, and $0 \leq \alpha \leq 2$, M1 and M2 are at least one selected from the group consisting of Al, Ni, Mn, Cr, Fe, Mg, Sr, V, Zn, W, Zr, B, Ba, Sc, Cu, Ti, Co, rare-earth elements, and a combination thereof, X is at least one selected from the group consisting of O, F, S, and P rinsing the cathode active material using a solution including a compound including thiol group; and drying the rinsed cathode active material.

2. The method according to claim 1, wherein rinsing the cathode active material using the solution including compound including thiol group comprises:

putting distilled water and the compound including thiol group into a reactor to prepare the solution including thiol group;

maintaining an inner temperature of the reactor at 5 to 50° C.; and putting the cathode active material into the reactor and stirring.

3. The method according to claim 1, wherein the compound including thiol group includes one selected from the group consisting of 2-thiazoline-2-thiol, 5-amino-1,3,4-thiadiazole-2-thiol, 1,3,4-thiadiazole-2,5-dithiol, 2,5-dimethylfuran-3-thiol, (1,2,4)thiadiazole-3,5-dithiol, 1-phenyl-1h-tetrazole-5-thiol, 4-methyl-4h-1,2,4-triazole-3-thiol, 5-methyl-1,3,4-thiadizole-2-thiol dithioglycol, s-triazine-2,4,6-trithiol, 7-methyl-2,6,8-trimercaptopurine, and 4,5-diamino-2,6-dimercaptopyrimidine.

4. The method according to claim 2, wherein putting distilled water and the compound including thiol group into the reactor to prepare the solution including thiol group includes mixing 0.01 to 10 parts by weight of the compound including thiol group per 100 parts by weight of DIW.

5. The method according to claim 1, wherein rinsing the cathode active material using the solution including compound including thiol group comprises:

depositing the cathode active material on a filter member; and filtering the solution including thiol group through the filter member including the cathode active material to rinse the cathode active material.

6. The method according to claim 1, wherein rinsing the cathode active material using the solution including compound including thiol group comprises:

putting distilled water and the compound including thiol group into a reactor to prepare the solution including thiol group;

maintaining an inner temperature of the reactor at 5 to 50° C.;

putting the cathode active material into the reactor and stirring;

depositing the rinsed cathode active material on a filter member; and filtering the solution including thiol group through the filter member including the cathode active material to rinse the cathode active material.

7. The method according to claim 1, wherein rinsing the cathode active material using the solution including compound including thiol group comprises:

depositing the rinsed cathode active material on a filter member;

filtering the solution including thiol group through the filter member including the cathode active material to rinse the cathode active material;

putting distilled water and the compound including thiol group into a reactor to prepare a solution including thiol group;

maintaining an inner temperature of the reactor at 5 to 50° C.; and putting the cathode active material into the reactor and stirring.

8. The method according to claim 1, wherein drying the rinsed cathode active material is performed at 50 to 400° C. for 1 to 20 hours.

9. The method according to claim 1, wherein in at least some particles of the cathode active material, at least one selected from the group consisting of Ni, Co, M1 and M2 has concentration gradient.

10. The method according to claim 9, wherein the area having concentration gradient occupies 80% or more of the entire particles area.

11. The method according to claim 9, wherein the area having concentration gradient occupies 10 to 50% of the entire particles area.

* * * * *

UNITED STATES PATENT AND TRADEMARK OFFICE
CERTIFICATE OF CORRECTION

PATENT NO.         : 10,230,107 B2
APPLICATION NO.    : 15/513795
DATED              : March 12, 2019
INVENTOR(S)        : Hyung Joo Noh et al.

Page 1 of 1

It is certified that error appears in the above-identified patent and that said Letters Patent is hereby corrected as shown below:

On the Title Page

At (22) PCT Filed, "Dec. 16, 2016" should read --Dec. 23, 2016--

Signed and Sealed this
Eighteenth Day of June, 2019

Andrei Iancu
*Director of the United States Patent and Trademark Office*